Dec. 23, 1930.  J. E. HORSTE  1,786,067

DRIVING ATTACHMENT FOR TRACTORS

Filed April 30, 1928  2 Sheets-Sheet 1

Inventor
Joseph E. Horste

By Whittemore Hulbert Whittemore Belknap
Attorneys

Dec. 23, 1930.  J. E. HORSTE  1,786,067
DRIVING ATTACHMENT FOR TRACTORS
Filed April 30, 1928  2 Sheets-Sheet 2

Inventor
Joseph E. Horste

By Whittemore Hulbert Whittemore Belknap
Attorneys

Patented Dec. 23, 1930

1,786,067

UNITED STATES PATENT OFFICE

JOSEPH E. HORSTE, OF DETROIT, MICHIGAN, ASSIGNOR TO DETROIT HARVESTER COMPANY, OF DETROIT, MICHIGAN, A CORPORATION OF MICHIGAN

DRIVING ATTACHMENT FOR TRACTORS

Application filed April 30, 1928. Serial No. 274,073.

This invention relates to attachments for tractors and the like and has particular reference to the means employed for driving the attachment from the usual power take off of the tractor or the like.

One of the primary objects of the present invention is to provide a reduction drive for the attachment capable of converting the rotative movement of the power take off mechanism to a reciprocable movement for driving the attachment.

A further object of the invention is to provide an arrangement of the foregoing character which is economical to manufacture and may be readily installed upon the tractor without materially altering the existing parts thereof.

Other objects and novel features of the invention are attributed to the peculiar construction and arrangement of parts to be more fully hereinafter referred to.

Figure 1:
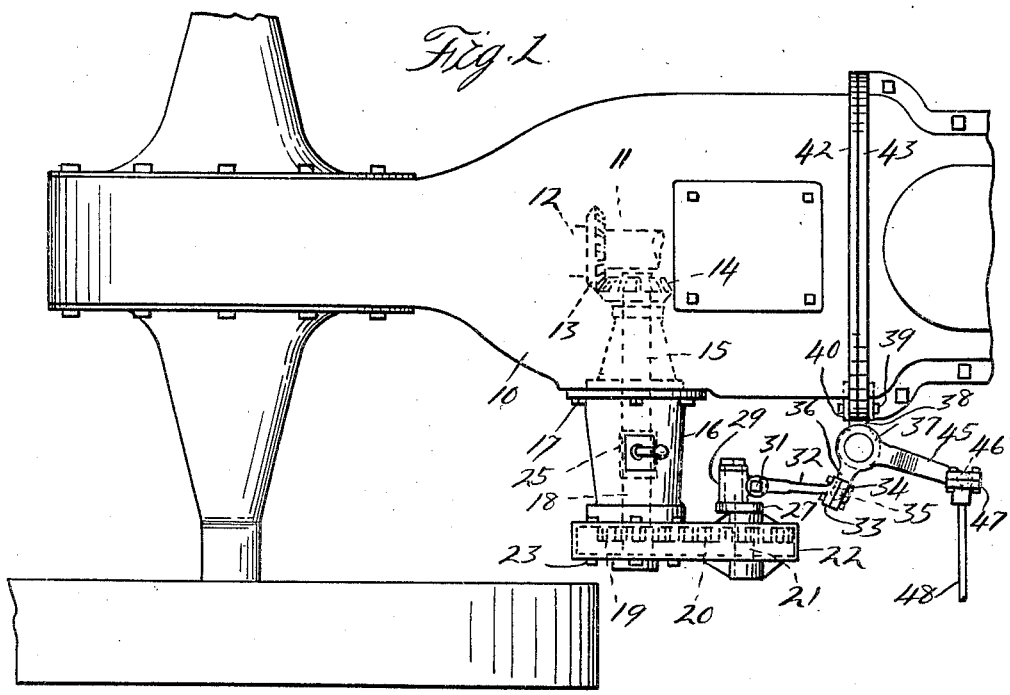
Figure 1 is a plan view of a portion of a tractor having my improved driving connection applied thereto.
Figure 2:
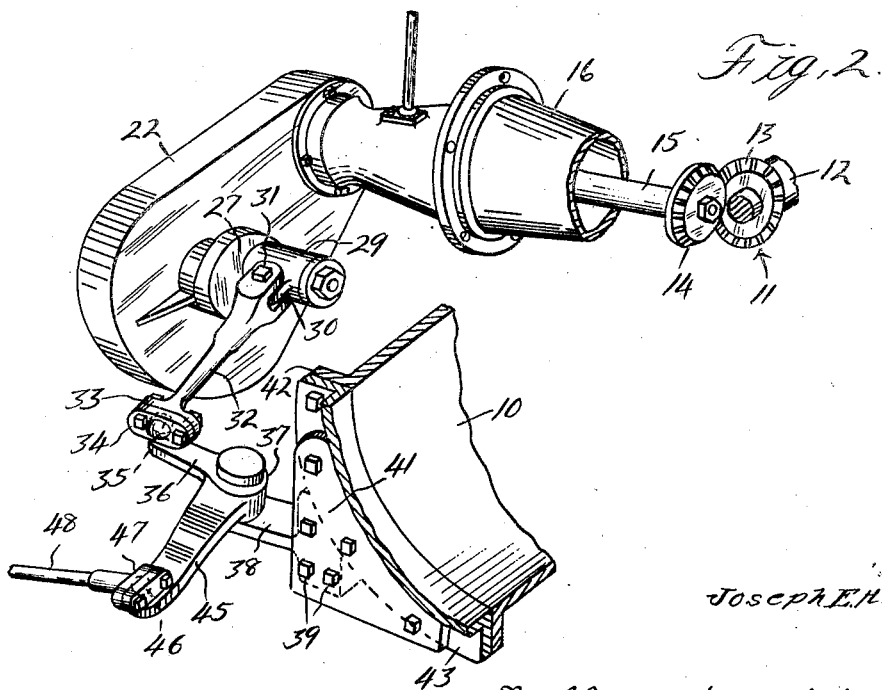
Figure 2 is a detail perspective view of the driving mechanism illustrated in Figure 1.

While it will be apparent as this description proceeds, that the present invention is capable of numerous and diversified uses, nevertheless, for the purpose of illustration I have herein illustrated this invention as used in connection with a Fordson tractor for driving a mower (not shown). In this connection I have illustrated fragmentarily, a tractor 10 having the usual power take off mechanism 11 comprising the driven shaft 12 carrying the gear 13 adapted to mesh with a gear 14 keyed to the shaft 15 which in turn is journalled in a suitable housing 16 secured to the side of the tractor casing as at 17. Journalled within the outer end of the housing 16 in axial alignment with the shaft 15 is a second shaft 18 carrying at the outer end thereof, a gear 19 adapted to mesh with a gear 20 preferably of larger diameter than the gear 19 and keyed to a stub shaft 21 journalled in a suitable housing 22. As shown, the latter completely encases the reduction gearing and is secured to the outer end of the housing 16 as at 23.

The adjacent ends of the shafts 15 and 18 are splined as indicated at 24 and slidably receive a suitable clutch collar 25. The arrangement being that when the collar 25 is shifted to the left in Figure 3 by means of the shifting fork 26, the collar will be disengaged from the shaft 24 rendering the reduction gearing 19 and 20 inoperative.

In order to convert the rotary movement of the reduction gearing aforesaid to a reciprocable movement, suitable for actuating a mower or the like the shaft 21 is provided with an eccentric 27. Sleeved upon the shaft 28 of the eccentric is a sleeve 29 having a laterally extending ear 30 pivotally connected by means of a pin 31 to the bifurcated end portion of a suitable lever 32. The opposite end of the lever 32 terminating in a half bearing 33 adapted to cooperate with the cap 34 to form a bearing for receiving the ball 35 projecting upwardly from the end of an arm 36 of the bell crank lever 37. The latter being pivotally mounted upon a suitable bracket 38 secured by means of the bolts 39 to the plates 40 and 41. As shown, the plates 40 and 41 are secured to the flanges 42 and 43 respectively formed upon the tractor housing.

The other arm 45 of the bell crank lever 37 is also provided at the outer end thereof with a ball 46 adapted to be received in the bearing portion 47 formed upon one end of the rod 48. The opposite end of this rod being preferably connected to a suitable conventional form of mower which forms no part of this invention and accordingly is not illustrated herein.

Figure 3:
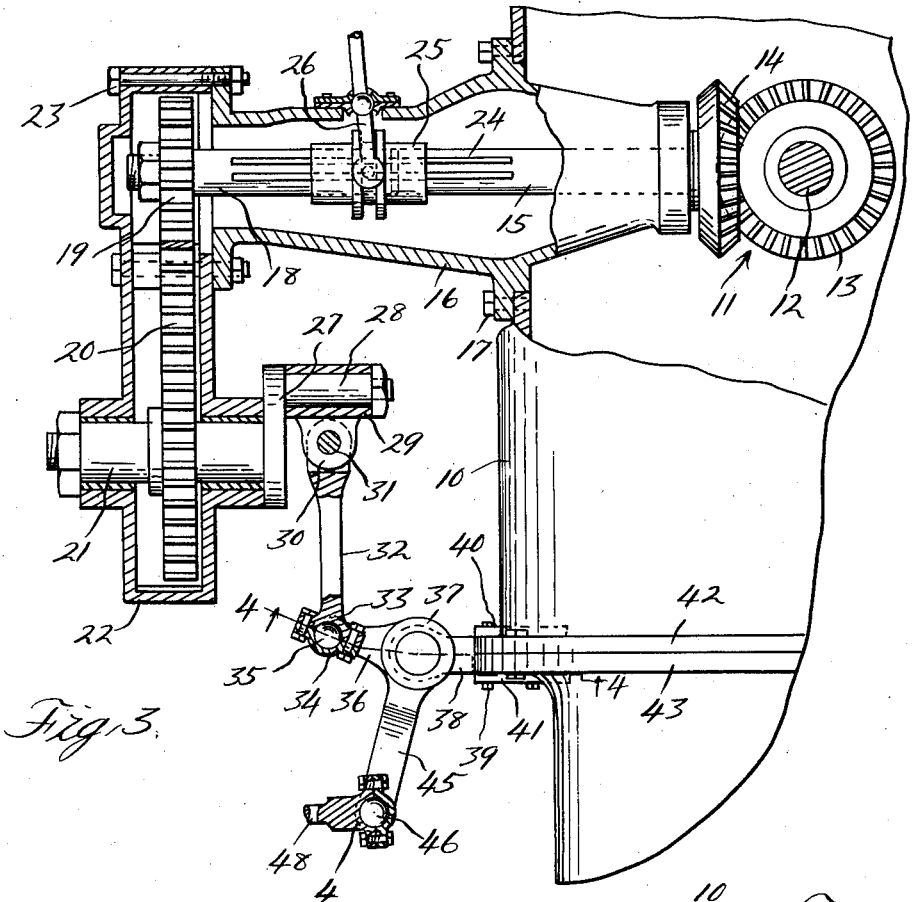
Figure 3 is a sectional plan view of the construction shown in Figure 1.
Figure 4:
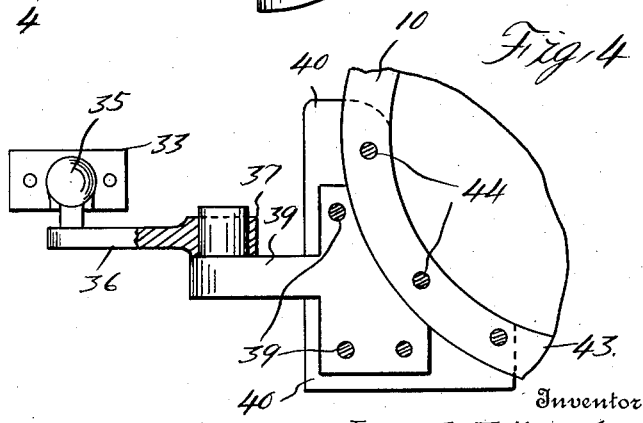
Figure 4 is a detail elevational view partly in section of the connection between the driving mechanism and tractor on the line 4—4 of Figure 3.

Referring now to the operation of the driving mechanism and assuming that the parts are in the position illustrated in Figure 3, it will be noted that the reduction gearing 19 and 20 will rotate the shaft 21 and accordingly the eccentric 27 and owing to the universal connection between the eccentric and arm 36 of the bell crank the latter will be oscillated about the pivotal connection thereof to the bracket 38. This oscillatory movement of the bell crank will impart a reciprocable movement to the rod 48 to actuate the mower or the like.

Thus from the foregoing it will be readily apparent that I have provided a relatively simple and efficient driving means capable of converting the rotary movement of the reduction gearing to a reciprocable movement of the actuating rod.

While in describing the present invention particular reference has been made to the fact that the driving means is used in connection with mowers, it will be apparent that the same may be readily applied to any apparatus requiring a reciprocatory movement and accordingly the invention contemplates such an arrangement.

What I claim as my invention:

1. A power take-off attachment for tractors including a housing attachable to a part of the tractor, parallel shafts in the housing, one of said shafts constituting the driving shaft of the attachment, the other shaft constituting the driven shaft of the attachment, gearing in the housing operatively connecting said shafts, a gear carried by the driving shaft at one end thereof and engageable directly with the power take-off gear of the tractor, a bracket attachable to another part of the tractor, a bell crank lever having a pivot on the bracket in a plane at substantially right angles to the driven shaft, an eccentric at one end of the driven shaft, a link terminally connected to the eccentric and to one end of the lever, and a pitman terminally connected to the other end of the lever.

2. A power take-off attachment for tractors including a housing attachable to a part of the tractor, parallel shafts in the housing, one of said shafts constituting the driving shaft of the attachment, the other shaft constituting the driven shaft of the attachment, a gear carried by the driving shaft at one end thereof and engageable directly with the power take-off gear of the tractor, gearing in the housing operatively connecting said shafts, an eccentric at one end of the driven shaft, a link pivotally connected to the eccentric, a bell crank lever having a universal connection with the link, a pitman rod having a universal connection with the lever, and a bracket having a pivot for the lever and attachable to a part of the tractor.

In testimony whereof I affix my signature.

JOSEPH E. HORSTE.